US007072200B2

(12) United States Patent
Lanni

(10) Patent No.: US 7,072,200 B2
(45) Date of Patent: Jul. 4, 2006

(54) CRADLE FOR RECEIVING AN ADAPTER

(75) Inventor: Thomas W. Lanni, Laguna Niguel, CA (US)

(73) Assignee: Comarco Wireless Technologies, Inc., Irvine, CA (US)

( * ) Notice: Subject to any disclaimer, the term of this patent is extended or adjusted under 35 U.S.C. 154(b) by 553 days.

(21) Appl. No.: 10/435,435

(22) Filed: May 9, 2003

(65) Prior Publication Data

US 2003/0228792 A1 Dec. 11, 2003

Related U.S. Application Data

(63) Continuation-in-part of application No. 10/166,214, filed on Jun. 10, 2002.

(51) Int. Cl.
*H02M 1/00* (2006.01)
(52) U.S. Cl. ..................................... 363/146
(58) Field of Classification Search ................. 363/146
See application file for complete search history.

(56) References Cited

U.S. PATENT DOCUMENTS

| | | | |
|---|---|---|---|
| 5,170,067 A | 12/1992 | Baum et al. | |
| 5,736,830 A * | 4/1998 | Weng | 320/108 |
| 5,783,927 A | 7/1998 | Chen | |
| 5,940,282 A | 8/1999 | Oglesbee | 363/21 |
| 5,977,747 A | 11/1999 | Huang | |
| 6,057,610 A | 5/2000 | Nierescher | 307/72 |
| 6,172,891 B1 | 1/2001 | O'Neal et al. | |
| 6,179,633 B1 | 1/2001 | Inada | |
| 6,266,261 B1 | 7/2001 | Lanni | |
| 6,433,274 B1 | 8/2002 | Doss et al. | 174/50 |
| 6,502,777 B1 * | 1/2003 | Liao | 242/373 |
| 2002/0071290 A1 | 6/2002 | Youn et al. | 363/15 |

FOREIGN PATENT DOCUMENTS

| | | |
|---|---|---|
| GB | 2291278 A | 1/1996 |
| GB | 2326540 A | 12/1998 |
| WO | 99/12244 | 3/1999 |

OTHER PUBLICATIONS

PC World Technology Advice You Can Trust, 2-pgs, Web link: http://www.pcworld.com/features/article/0,aid,105851,pg,12,00.asp.
ZDNet, ZDNet AnchorDesk, E-mail newsletter, (Reprint of 11/22 article), "Hey Road Warriors: This Gadget will Charge You UP", 2-pgs, Web link: http://www.zdnet.com/anchordesk/stories/story/0,10738,2898375,00.html.
ZDNet, ZDNet Tech Update Today, E-mail newsletter, "Got Juice? It's a must-have for road warriors", 2-pgs, Web link: http://techupdate.zdnet.com/techupdate/stories/main/0,14179,2898233,00.html.

(Continued)

*Primary Examiner*—Gary L Laxton
(74) *Attorney, Agent, or Firm*—Pillsbury Winthrop Shaw Pittman LLP

(57) ABSTRACT

A cradle casing has a DC/DC adapter to receive DC power from a DC power source and generate a first DC power signal. A sleeve accepts an AC/DC adapter, and guides movement of the AC/DC adapter when the AC/DC adapter is inserted into the cradle casing. The AC/DC adapter is capable of receiving AC power from an AC power source and generating a second DC power signal. A circuit receives at least one of the first DC power signal and the second DC power signal and outputs a third DC power signal.

16 Claims, 12 Drawing Sheets

OTHER PUBLICATIONS

AllNetDevices, "Company Unveils Mobile Power and Palm Presentation Products", 2-pgs, Web link: http://www/allnetdevices.com/wireless/news/2002/07/02/company_unveils.html.

PC World.Com, Technology Advice You Can Trust, Mobile Gear Gets a Charge on the Run, More power to you: Seidio, IGo unveils kits that recharge notebooks, PDAs, cell phones from various sources, 2-pgs, Web link: http://www.pcworld.com/news/article/0,aid,102345,00.asp.

PC MAGAZINE, Highlights from PC Expo 2002, 1-pg, Web link: http://www.pcmag.com/article2/0,4149,286129,00.asp.

Mobility Electronics, "Mobility Electronics Unveils "Juice"—First Universal, Combination AC/DC and DC/DC Power Adapter for Notebooks and Mobile Devices", 3-pgs, Web link: http://www/mobilityelectronics.com/releases/2002/2002_26_06_01.asp.

"iGo-Buy batteries and accessories for your cellular, notebook and handheld devices", Web link: http://www.igo.com/ProductDetail.asp?catalog%5F...e=iGoCAT&product%5Fid=21541&variant%5Fid=134121 (1 of 2) [Jan. 21, 2003 7:17:45 PM].

Juice—The power of one, iGo mobility products, "Juice$^{70}$ Turning Power into Productivity"; 1-pg, Web link: http://www.igo.com/mapfiles/juice.asp [Nov. 8, 2002 9:50:19 AM].

Mobility Electronics; Welcome, Mobility Electronics, The Mobile Computing Solutions Company, 1-pg, Web link: http://www.mobilityelectronics.com/[Nov. 8, 2002 9:49:27 AM].

Peripheral Powering System (PPS), iGo mobility products, Q&A, 2-pgs.

Combination AC and auto/air notebook power adapter, Juice$^{70}$™ The Power of One, iGo mobility products, Q&A, 2-pgs.

Juice $^{70}$198 The Power of One, iGo mobility products, 5-pgs.

ZDNet, ZDNet AnchorDesk, "Hey road warriors: This gadget will charge you up", 2-pgs, Web link: http://www.zdnet.com/anchordesk/stories/story/0,10738,2898375,00.html (1 of 2) [Dec. 3, 2002 10:48:28 AM].

"Mobility Electronics Announces the Production and Availability of 'Juice'—The First Combination AC.DC and DC.DC Power Adapter for Notebooks and Mobile Devices," 3-pgs, Web link: http://biz.yahoo.com/pmews/030113/lam020_1.html (1 of 3) [Jan. 13, 2003 9:13:47 AM].

European Patent Office Search Report Aug. 30, 2004.

MacCentral, Macworld's News Service, "iGo Juice charges PowerBook, PDA, cell phone", 2-pgs.

\* cited by examiner

CRADLE FOR RECEIVING AN ADAPTER

RELATED APPLICATION DATA

This application is a Continuation-In-Part of U.S. patent application Ser. No. 10/166,214, filed Jun. 10, 2002.

BACKGROUND

Many electronic devices, such as computers, personal digital assistants (PDAs), mobile telephones, compact disc and cassette players, and the like, are intended to be powered from both alternating current (AC) and direct current (DC) power sources. AC power sources include wall outlets, while DC power sources may include both batteries and vehicle power supplies, such as automobile cigarette lighters and airplane seat power supplies (such as the EMPOWER system). In order to receive power from these various AC and DC power sources, electronic devices must generally be provided with a number of separate power-converting power supplies. Moreover, each electronic appliance may receive operational power at a different required current or voltage. These operational requirements may also change depending on the status of the electronic device (e.g., whether the electronic device's battery is being recharged).

To power electronic devices such as computers, the manufacturer typically provides an external power supply. The external power supply may be a switching power supply that may weigh close to a pound and may be about eight inches long, four inches wide and about four inches high. In addition, the power supply may include a fixed output cable and/or fixed input cables and plugs, making it more difficult to be compactly stored.

Such external power supplies therefore contribute substantial additional weight that the user of the computer must carry with him or her to permit battery charging and/or operation from an electrical socket or other power source. Further, the external power supply can be bulky and may not be readily carried in typical cases for portable electronic devices, such as notebook and sub-notebook computers. Also, a separate power supply may be required for each peripheral device, such as a printer, external memory (e.g., a disk drive) or the like. Therefore, users need multiple power supplies, which consumes space and increases unnecessary weight. Each of these power supplies may be specifically designed for use with either a particular type of AC or DC power source. Therefore, particularly for portable electronic devices for which it is desirable to be capable of receiving electrical power from any of a number of AC and DC power sources, the user may need to continually carry multiple power supplies adapted for the variety of power sources that may be available.

Some of these deficiencies are addressed in U.S. Pat. Nos. 6,266,261, 5,636,110, 5,838,554, 6,091,611, and 6,172,884 to Lanni, which describe programmable power supplies. The output may be programmed by coupling interchangeable tips to an output cable or terminal of the power supply. A dual-stage power supply for converting AC and DC power input signals into a DC power output signal is also described. These patents, however, do not describe how the interchangeable tips may be conveniently and compactly stored to prevent damage and/or loss, which may be particularly important where the tips are small in size.

Other references that discuss power supplies capable of receiving both AC and DC power input are similarly deficient. For example, U.S. Pat. No. 6,172,891 to O'Neal et al. describes a power supply that has fixed input cables and plugs for receiving AC and DC power input signals and a fixed output cable and connector for providing a DC output to an electronic device. Moreover, the O'Neal reference does not describe any mechanism for converting the AC or DC input power signals into DC power output signals of various characteristics to match the input power requirements of more than one electronic device.

The power supply disclosed in U.S. Pat. No. 6,057,610 to Nierescher includes a fixed AC input plug to which a DC plug attachment may be fitted such that the power supply can receive a DC power input power signal. As with the O'Neal et al. patent, the input cable to the AC input plug is fixed. While the DC plug attachment and the output cable are shown as being potentially removable, the Neirescher patent does not disclose how these attachments are to be conveniently stored with the power supply.

U.S. Pat. No. 5,940,282 to Oglesbee also describes a power supply that includes a fixed AC input plug to which a removable DC input plug attachment may be coupled. No output cable, whether fixed, removable or retractable is described. Furthermore, as with the Nierescher patent, the Oglesbee patent does not disclose any mechanism for compactly and conveniently storing the input plugs and cables or the output cables.

Current AC/DC and DC/DC combination systems are bulky. Even in the event that the user only needs to use the DC/DC adapter in such a system, the user must also carry the AC/DC adapter, resulting in inconvenience for the user. If the user already owns an AC/DC converter, the user's AC/DC converter cannot be utilized to form a combination AC/DC and DC/DC adapter system. Instead, the user must purchase a new AC/DC and DC/DC adapter system.

It would be desirable to provide a power supply with a thin package and designed to fit within a standard pocket on a shirt or a standard calculator pocket on a brief case. In addition, it is believed to be desirable that the power supply be capable of receiving input power from either AC or DC power sources and be capable of providing a programmable output power to meet the requirements of a host of electronic devices.

BRIEF DESCRIPTION OF THE FIGURES

A detailed description of embodiments of the invention will be made with reference to the accompanying drawings, wherein like numerals designate corresponding parts in the several figures.

DETAILED DESCRIPTION

Embodiments of the present invention are directed to a power supply for receiving power from either an AC or a DC power source and providing an output power signal which is suitable for powering any of a host of electronic devices. The disclosures of (a) U.S. Pat. Nos. 6,266,261, 5,636,110, 5,838,554, 6,091,611, and 6,172,884; and (b) U.S. patent application Ser. No. 10/336,585, filed Jan. 3, 2003, are herein incorporated by reference.

Figure 1:
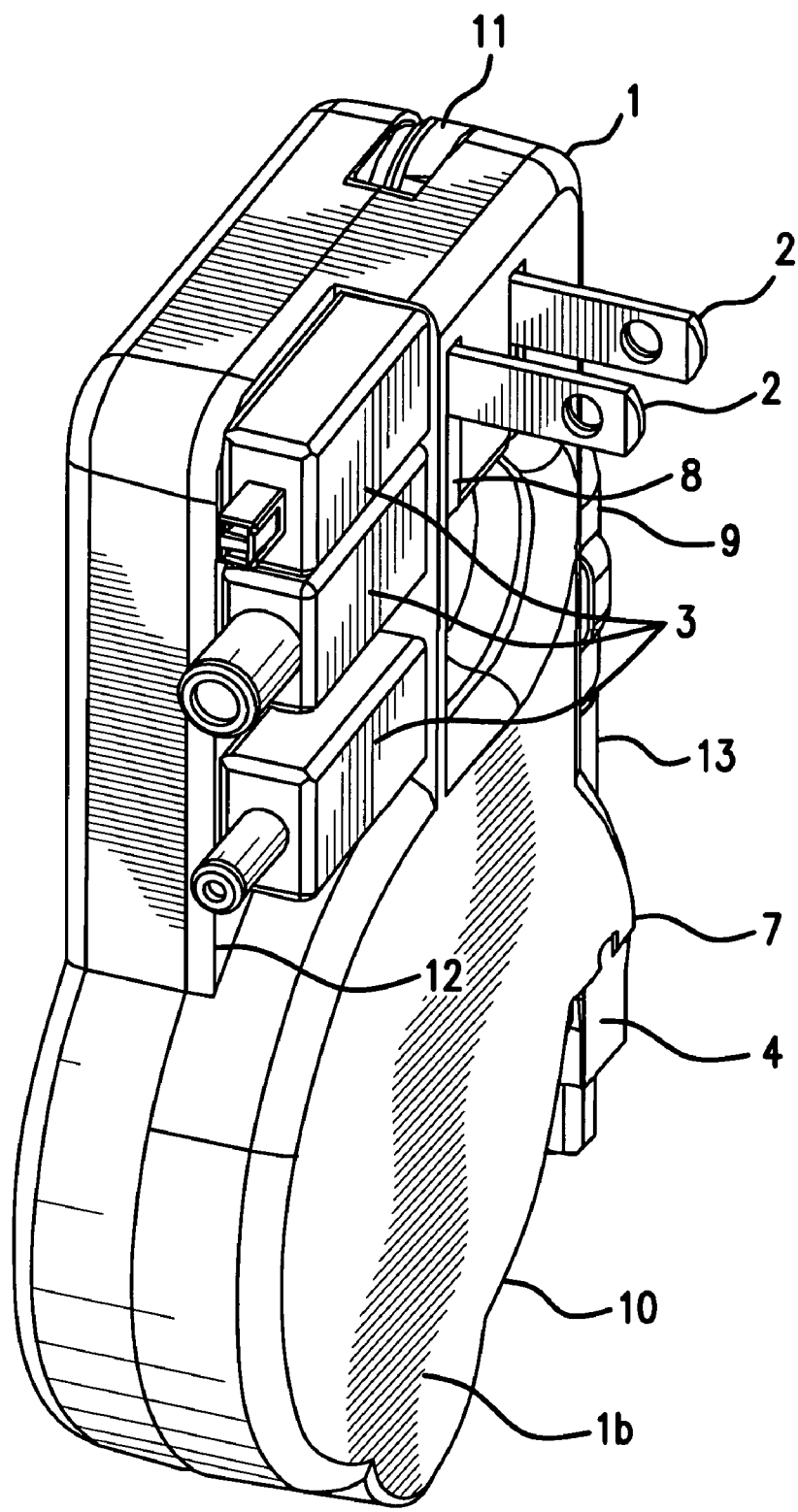
FIG. 1 is a left back perspective view of an embodiment of the present invention.
Figure 2:
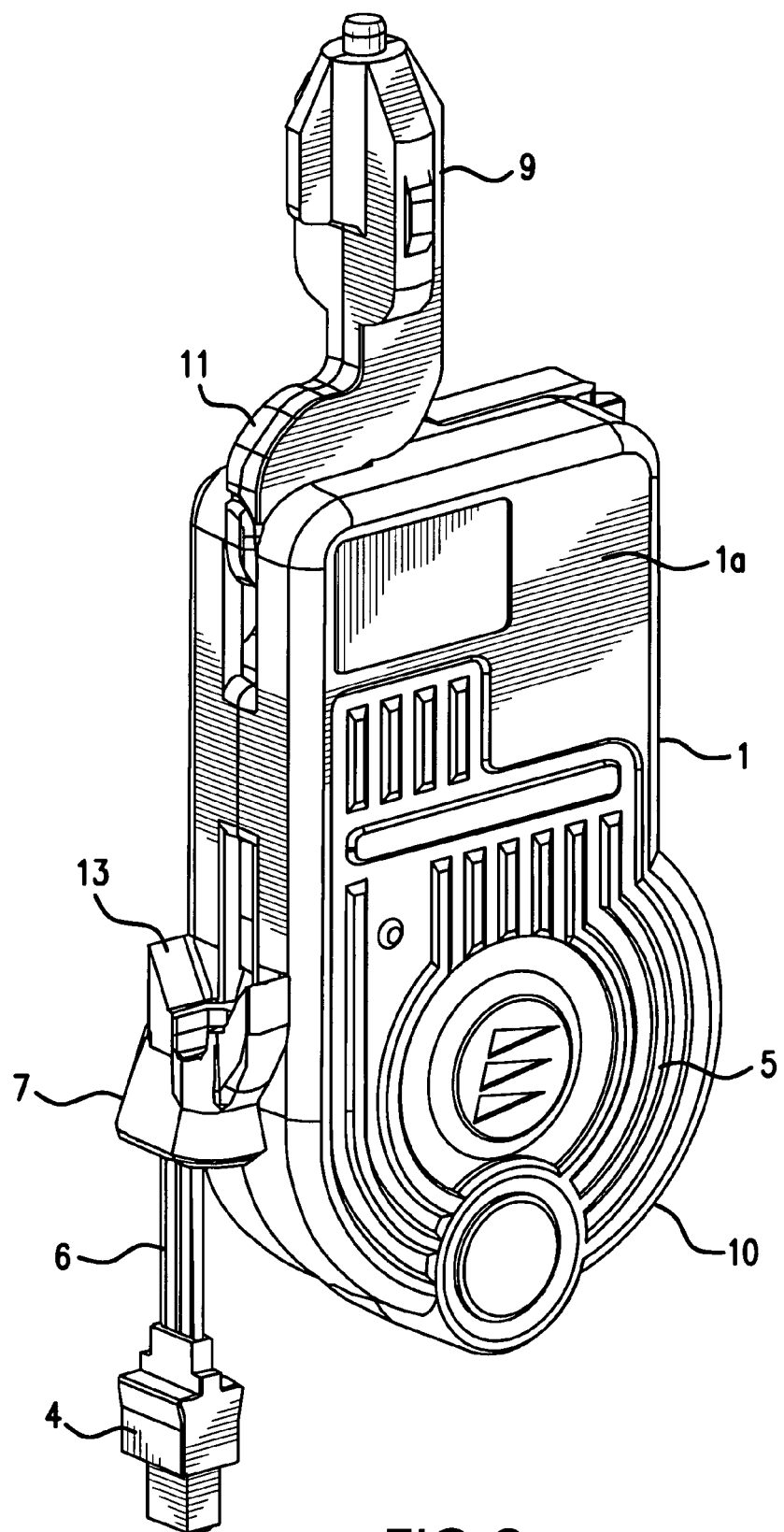
FIG. 2 is a right front perspective view of an embodiment of the present invention.

FIGS. 1 and 2 show a power supply according to an embodiment of the present invention. The power supply may include an outer housing 1 with a front surface 1a and a back surface 1b, that encloses internal power conversion circuitry. The outer housing may be made of high impact suitable plastics, such as Lexan or ABF, or a similar lightweight, non-conductive material, and may include multiple louvers 5 that define multiple openings therebetween to increase the amount of heat dissipated by the outer housing 1. Although in the illustrated embodiment, the louvers 5 are only included on the front surface 1a, in alternative embodiments of the invention, both the front surface 1a and the back surface 1b of the outer housing 1 may include such louvers 5. For heat transfer purposes, however, it is generally useful to include louvers 5 only on surfaces that are exposed to significant air circulation. For example, in the illustrated embodiment, louvers 5 may not be included on the back surface 1b since the back surface 1b may be located near a wall when the prongs 2 of the AC input plug are coupled to a wall outlet.

Although the term "openings" is used to describe the areas of the outer housing 1 between louvers 5, it should be understood that the internal components of the power supply may not be directly exposed (i.e., "open to") to air at those openings. In fact, the openings may instead be areas at which the material of the outer housing is simply thinner than the areas of the outer housing 1 at which the louvers 5 are present. However, the thickness of the outer housing 1 material at the openings may still be chosen to be thick enough to prevent the entry of liquids or other elements that may damage internal components of the power supply. In preferred embodiments, the thickness of the outer housing 1 at the openings may be chosen to be between 1 and 3 mils.

The configuration of the openings in the outer housing 1 may be designed to improve the appearance of the power supply. In embodiments of the present invention, however, the openings may be designed to provide sufficient air circulation and heat transfer surface area so that, even when operating at maximum rated output power, the surface temperature of the outer housing 1 is less than a desired maximum temperature selected based on the potential for injury to a user and/or damage to internal components of the power supply. For example, the outer housing 1 may be designed not to exceed a maximum temperature of one hundred and forty degrees Fahrenheit (140° F.) and preferably less than one hundred and twenty degrees Fahrenheit (120° F.) when the unit is operated at the maximum rated power of, for example seventy five watts DC. In embodiments of the invention, the portion of the outer housing 1 at the openings may be made of a different material (e.g., metals, composites, ceramics or other heat conductive and liquid resistant materials) than the portion of the outer housing 1 at the louvers 5.

In embodiments of the invention, the outer housing 1 may include a rounded portion 10 that encloses a chamber containing a portion of the output cable 6 when the output cable 6 is in a retracted state. In embodiments of the invention, the outer housing may include an outlet 7 with an opening 16 through which the output cord 6 may exit the outer housing 1 (see FIG. 3). Although the output cable 6 may generally be of any type typically used for power output, in embodiments in which the output cable 6 is retractable, the output cable 6 is preferably of a type that is easily stored within the outer housing 1, such as a flat cable. However, in alternative embodiments, the body of the cable may be rounded. The output cable 6 may end in an output terminal 4. When the output cable 6 is retracted, the output terminal 4 may rest against the outlet 7. In embodiments of the invention (as discussed in greater detail below with respect to FIG. 3), the mechanism for retracting the output cable 6 may be biased toward the retracted state. In such embodiments, resting the output terminal 4 against the outlet 7 may easily permit the user to pull on the output terminal 4 to overcome such bias to extend the output cable 6.

In embodiments of the invention, the output terminal 4 may be coupled to interchangeable tips 3 to vary the output power characteristics (e.g., voltage and/or current) of the power supply. In particular embodiments of the invention, the output terminal may have a first pin coupled to an output voltage, a second pin coupled to ground, a third pin for returning a current control signal to the power conversion circuitry within the outer housing 1 and a fourth pin for returning a voltage control signal to the power conversion circuitry. In particular embodiments of the invention, the output terminal may have four conductive pins, such as those described in U.S. Pat. Nos. 5,838,554, 6,091,611, and 6,172,884. However, alternatively configured output terminals may also be used.

One end of each tip 3 may be of a common shape and size adapted to mate with the free end of the output terminal 4, while the other end of each tip may be of a unique shape, size and/or pin configuration adapted to mate with the power input terminal of one or more electronic devices. For example, a first tip 3 may have an end configured to mate with the power input terminal of Toshiba laptop computers, while a second tip may have an end configured to mate with the power input terminal of Compaq laptop computers, and a third tip 3 may have an end configured to mate with the power input terminal of Nokia cellular telephones. As disclosed in U.S. Pat. Nos. 5,838,554, 6,091,611, and 6,172,884, the tips 3 may be contain a resistive programming element and the associated power conversion circuit may output power of a particular voltage, current or other characteristic based on the resistive value of the programming resistor. Alternatively, the output power characteristics may be changed by the receipt of an appropriate control signal from the electronic device itself. In embodiments of the former type, in addition to each having an end configured to mate with the power input terminal of one or more electronic devices, each tip may include one or more programming elements (e.g., resistors) that are configured to cause the power supply to output power satisfying an input power requirement of the electronic devices with which the tip is configured to mate. The output power characteristics may also be set based on control circuitry within the tip itself, as discussed below with respect to FIG. 10.

Tips 3 that are not currently being used may be kept within a tip recess 12 in the outer housing. In embodiments of the invention, a wall of the tip recess 12 to which the tips 3 may be removably affixed may include a docking site of the same size and shape as the end of the output terminal 4 with which the tip 3 would mate when in use. In such an embodiment the tips 3 would each be mated with a docking site when not in use. In embodiments of the invention, the tip recess 12 may have one docking site, and the outer body of each of the tips 3 themselves may have additional docking sites, such that one stored tip 3 may be mated to the wall of the tip recess 12 and the remaining stored tip 3 may be successively stacked thereon. Alternatively, the tips 3 may be held in the tip recess 12 by means of a fastener, such as a cord or clip. In applications in which the power supply is to be transported frequently, it may be desirable to secure the tips 3 within the tip recess 12 in a way that prevents movement of the tips 3 so as to avoid loss or damage to the tips 3.

The power supply may also include an AC input plug with prongs 2. The prongs 2 of the AC input plug may be electrically coupled to input terminals of an AC-DC power conversion circuit. Although a two-prong AC input plug is shown, other types of AC input plugs with different numbers of prongs (e.g., a three-prong plug with a prong connected to ground) and/or different prong configurations (e.g., such as may be suitable for use with the outlets provided in different countries) may alternatively be used.

According to an embodiment of the invention, the prongs 2 may be retractable. In embodiments of the invention similar to that illustrated in FIGS. 1 and 2, the prongs 2 may protrude substantially perpendicularly from the surface of the outer housing when the AC input plug is coupled to a wall outlet or other AC power source, and pivot into recesses 8 in the outer housing when the AC input plug is not being used. Although in the illustrated embodiment, the prongs 2 are shown as pivoting into the recesses 8, in alternative embodiments, the prongs 2 may be retracted into the outer housing 1 in other ways. For example, the prongs 2 may be retracted by sliding them into deeper recesses in the outer housing 1 in the direction of the length of the prongs 2. Moreover, in embodiments in which the prongs 2 are retracted by pivoting, the direction of rotation may be different than that shown. For example, in embodiments of the invention, the prongs may be pivoted towards each other and may overlap each other in the retracted position.

In alternative embodiments of the invention, the entire AC input plug, including a plug body, may move when the AC input plug is changed to the retracted state. The AC input plug may be extended by engaging and rotating a tab to rotate the AC input plug out of the recess in the outer housing 1. In alternative embodiments, the AC input plug may be spring-loaded such that a catch locks the AC input plug in the retracted position and the spring rotates the AC input plug into the extended position once the catch is released. The AC input plug may include detentes or use other methods to maintain the prongs 2 in the extended or retracted position.

Once extended, the AC input plug can be inserted into a wall socket or other AC power source. In the embodiment illustrated, the outer housing may hang down against a wall for stability and support. In alternative embodiments, the AC input plug may be recessed and fixed in the outer housing 1 of the power supply to receive an electrical cord that is removably attached between the AC input plug and an AC power source.

Furthermore, for safety reasons, in embodiments of the invention, the prongs 2 may be electrically disconnected from the power conversion circuit when in the retracted position. When in the extended position, however, the prongs may be electrically coupled to an AC-DC power conversion circuit, such as those described in U.S. Pat. Nos. 6,266,261 and 6,172,884, which may be mounted on a printed circuitboard (14 in FIG. 3) within the outer housing.

The power supply may also include a DC input plug 9. The DC input plug 9 may have an end adapted for mating with an automobile cigarette lighter (as shown in FIG. 2), an airplane seat power supply, a battery pack, or the like. As with the AC input plug (prongs 2), the DC input plug 9 may be retractable. In the illustrated embodiment, the DC input plug 9 may be pivoted between an extended position (shown in FIG. 2) and a retracted position in which the DC input plug 9 may rest with one side against the outer housing. The DC input plug 9 may include a pivot arm 11 that is rotatably affixed to the outer housing 1. In the retracted position, the end of the DC input plug 9 opposite the pivot point may rest within a protective cap 13. As shown in FIG. 2, the protective cap 3 is formed as part of the outlet 7. The DC input plug 9 may be coupled to a DC-DC power conversion circuit, such as those described in U.S. Pat. Nos. 6,266,261 and 6,172,884, when in the extended state. However, the DC input plug 9 may be decoupled from the circuit when in the retracted state (e.g., resting within the protective cap 3).

In embodiments of the invention, the power conversion circuit may consist of two portions, namely a primary stage capable of converting an AC input current to a DC current and a secondary stage capable of converting a DC current to an AC current. Thus, when the two portions are combined such that the output of the secondary stage is transmitted to the primary stage as an input, the combination may be considered a DC-DC power conversion circuit and the primary stage alone may be considered an AC-DC power conversion circuit. In alternative embodiments, the primary stage may be a DC-DC power conversion circuit and the secondary stage may be an AC-DC power conversion circuit designed to output DC power that can be input to the primary stage. Two-stage power conversion circuits that may be used in embodiments of the present invention are described in U.S. Pat. No. 6,266,261, particularly with respect to FIGS. 3A–3B, 7A–7B, 51, and 55–56 thereof.

To reduce the amount of space occupied by the power conversion circuit, the primary stage and the secondary stage may be mounted on the same circuit board in embodiments of the invention. Alternatively, the primary stage and the secondary stage may be contained in separable compartments of the outer housing 1, such that the DC input plug 9 and a DC-AC primary stage of the power conversion circuit may be removably coupled to the remainder of the power supply.

Figure 3:
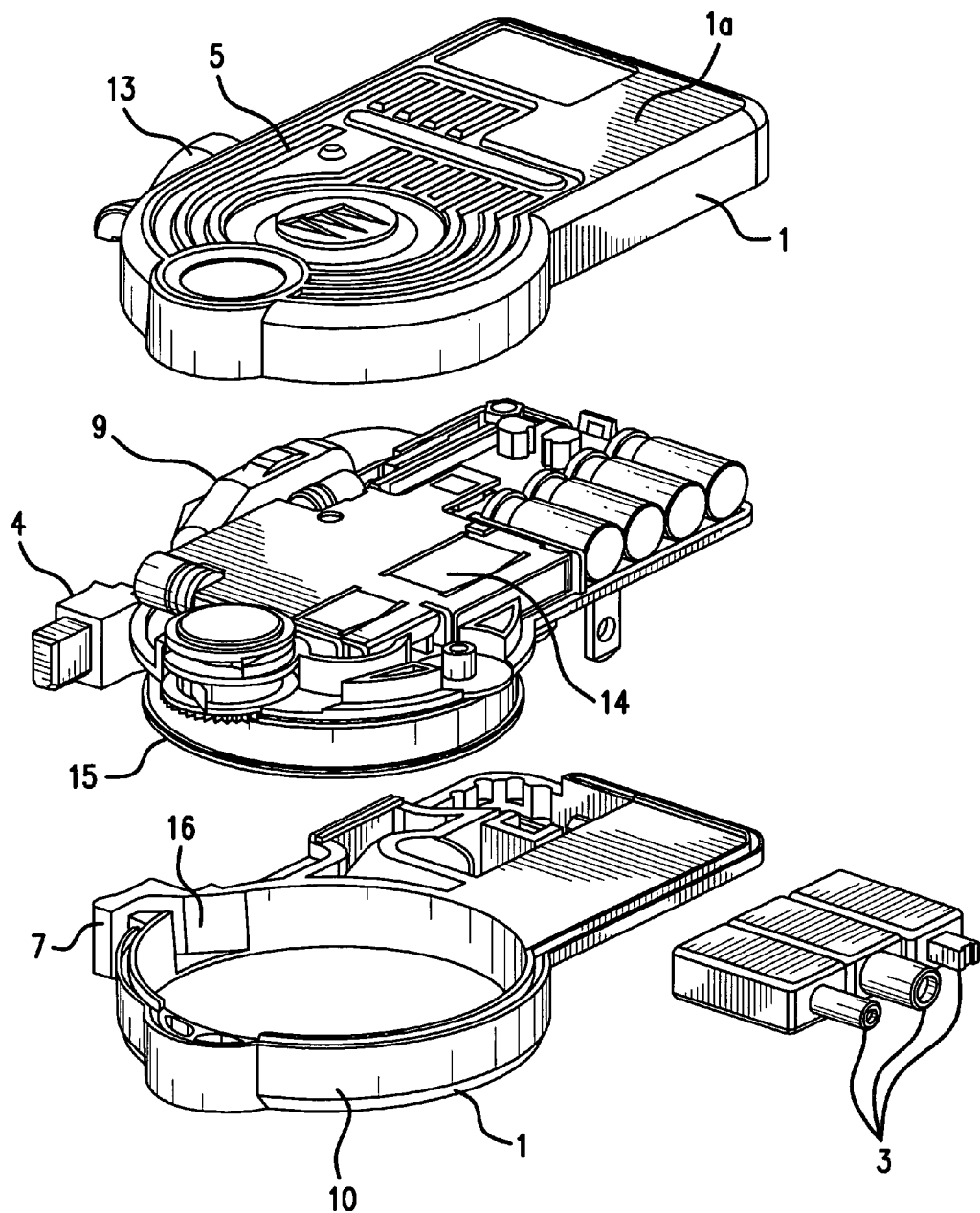
FIG. 3 is a exploded top right perspective view of an embodiment of the present invention.

FIG. 3 depicts an exploded view of the power supply according to an embodiment of the present invention. The rounded portion 10 of the outer housing 1 may include a take-up spool 15 around which the retracted portion of the output cable 6 may be wrapped. In embodiments of the invention, the take-up spool may be mounted on an axle that is biased (e.g., using a torsion spring) to pull the output cable 6 into the outer housing 1. In such embodiments, the outlet 7 may include a locking mechanism that a user may activate to apply a force to an unretracted portion of the output cable 6 to prevent the unretracted portion of the output cable 6 from being drawn into the outer housing 1. Alternatively, the take-up spool 15 may include teeth or other projections that interfere with a movable stop internal to the rounded portion 10 of the outer housing 1, such that as the user pulls on the output cable, the stop permits only unidirectional rotation of the take-up spool 15. The user may move the stop away from the take-up spool 15 in order to retract the output cable 6. In embodiments in which the take-up spool 15 is not biased, a handle may be mounted on the surface of the outer housing to allow the user to manually rotate the take-up spool 15.

An alternative embodiment is directed to a cradle for receiving an AC/DC adapter. The cradle may be formed within a cradle casing having a DC/DC adapter. The AC/DC adapter may slide into the cradle, and when fully inserted, may become electrically and mechanically coupled to the cradle casing. Accordingly, when the AC/DC adapter is in the cradle, the combination may receive power from either an AC source (e.g., a household electric outlet) or a DC source (e.g., a cigarette lighter in an automobile, or an electrical outlet on a airplane), and output DC power to power an electronic device. The cradle casing is relatively small, allowing a user to easily transport the cradle casing. The electronic device can be powered whether the only available power source is AC or DC. The cradle casing also makes efficient use of a single output cable. When the AC/DC adapter is inserted into the cradle, a decision circuit in the cradle casing may have a function of determining which power source (e.g., the DC source or the AC source) is used to power the electronic device. The decision circuit may be coupled to an output cable, which may be stored within a cable storage device within the cradle casing. Accordingly, rather than each of the DC/DC adapter and the AC/DC adapters having either own separate output cords to directly coupled to the electronic device, a single output cord within the cradle casing may be utilized to supply power to the electronic device.

Figure 4A:
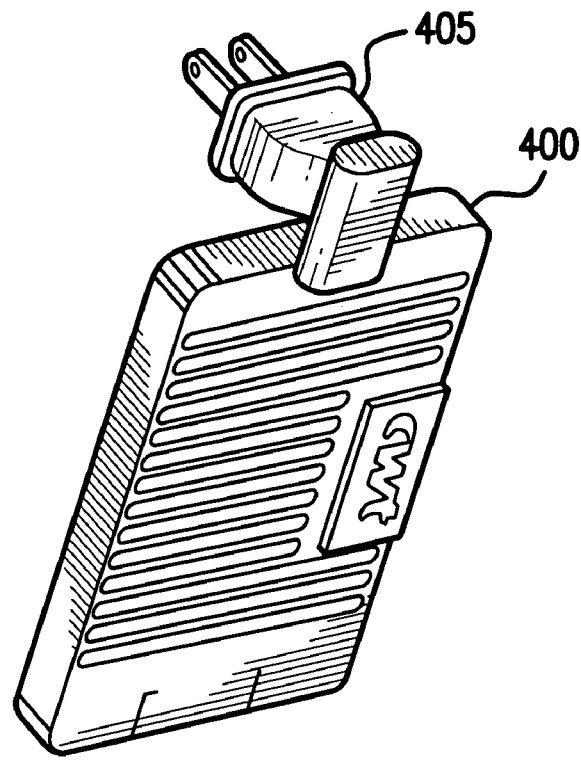
FIG. 4A illustrates an AC/DC adapter according to an embodiment of the invention.

FIG. 4A illustrates an AC/DC adapter 400 according to an embodiment of the invention. As illustrated, the AC/DC adapter 400 may include a plug 405 to plug into an AC power source such as a household electric outlet to receive 110 V AC. The AC/DC adapter 400 may have a function of receiving the AC power from the AC power source and converting and outputting DC power. The AC/DC adapter 400 may be coupled to a wire to power an electronic device requiring DC power.

Figure 4B:
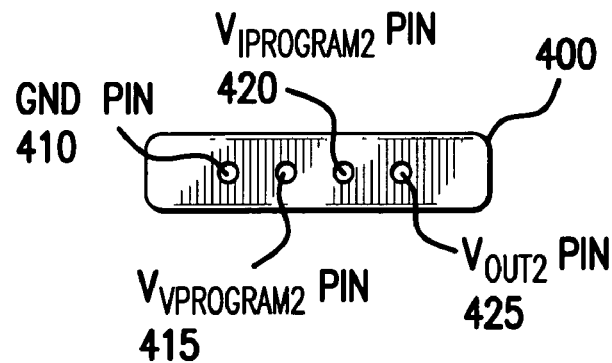
FIG. 4B illustrates a bottom-side view of an AC/DC adapter according to an embodiment of the invention.

FIG. 4B illustrates a bottom-side view of the AC/DC adapter 400 according to an embodiment of the invention. As shown, the AC/DC adapter 400 may include 4 output pins: a ground (GND) pin 410, a voltage programming voltage ($V_{Vprogram2}$) pin 415, as discussed below with respect to FIG. 10; a current programming voltage ($V_{Iprogram2}$) pin 420, as also discussed below with respect to FIG. 10; and an output voltage ($V_{out2}$) pin 425. The pins may be coupled to a female-type receptacle to electrically couple to the AC/DC adapter 400. The female-type receptacle may be coupled to a cable, an electronic device, or cradle casing 500, as discussed below with respect to FIGS. 5A–6.

Figure 5A:
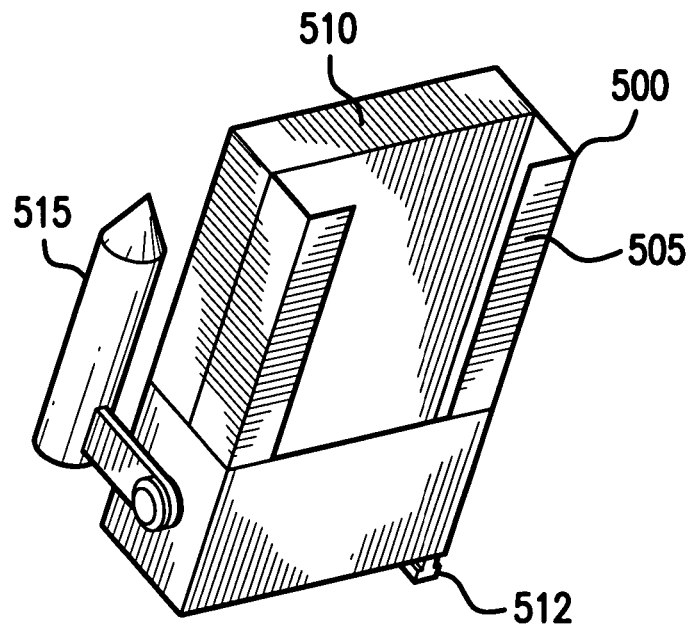
FIG. 5A illustrates a cradle casing according to an embodiment of the invention.

FIG. 5A illustrates a cradle casing 500 according to an embodiment of the invention. The cradle casing may include a DC/DC adapter housed therein to receive DC power via DC plug 515 from a DC power source, and convert it to DC power having a different voltage. The DC/DC adapter may be located within a back portion 510 of the cradle casing 500. The DC/DC adapter may be a high-performance adapter capable of producing up to 120 watts of power, for example. The cradle casing 500 may also include a sleeve 505, which in capable of receiving an AC/DC adapter 400 of a predetermined size and shape. A user may slide the AC/DC adapter 400 into the sleeve 505 until fully inserted therein. Once fully inserted, the AC/DC adapter 400 may be electrically coupled to the cradle casing 500. The cradle casing may include an output cable 512, to electrically couple the cradle casing to an electronic device to be powered. Although shown coming out of the bottom right-hand side of the cradle casing 500, the output cable 512 may come out of an opening in any suitable area of the cradle casing 500.

Figure 5B:
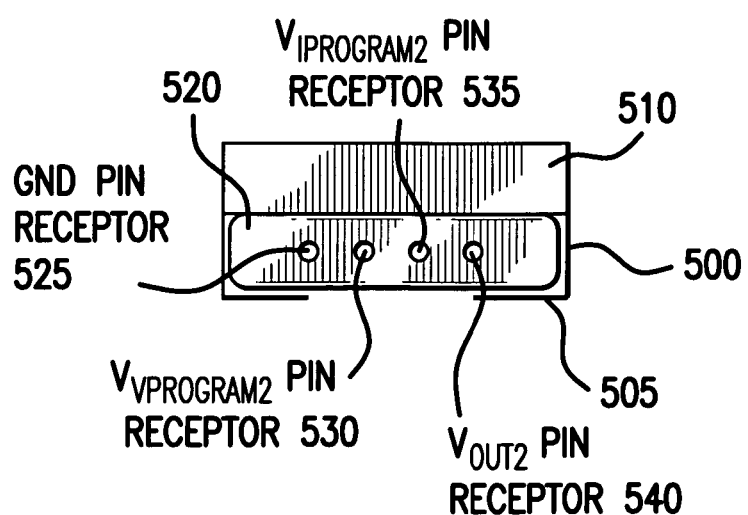
FIG. 5B illustrates a top-side view of the cradle casing according to an embodiment of the invention.

FIG. 5B illustrates a top-side view of the cradle casing 500 according to an embodiment of the invention. As shown, the cradle casing may include a female-type connection device 520 to couple to the output pins (e.g., 410, 415, 420, and 425) of the AC/DC adapter 400. When the AC/DC adapter 400 is fully inserted into the sleeve 505 of the cradle casing 500, the output pins of the AC/DC adapter 400 may mate with the female-type connection device 520 to become both mechanically and electrically coupled to the cradle casing 500.

Figure 5C:
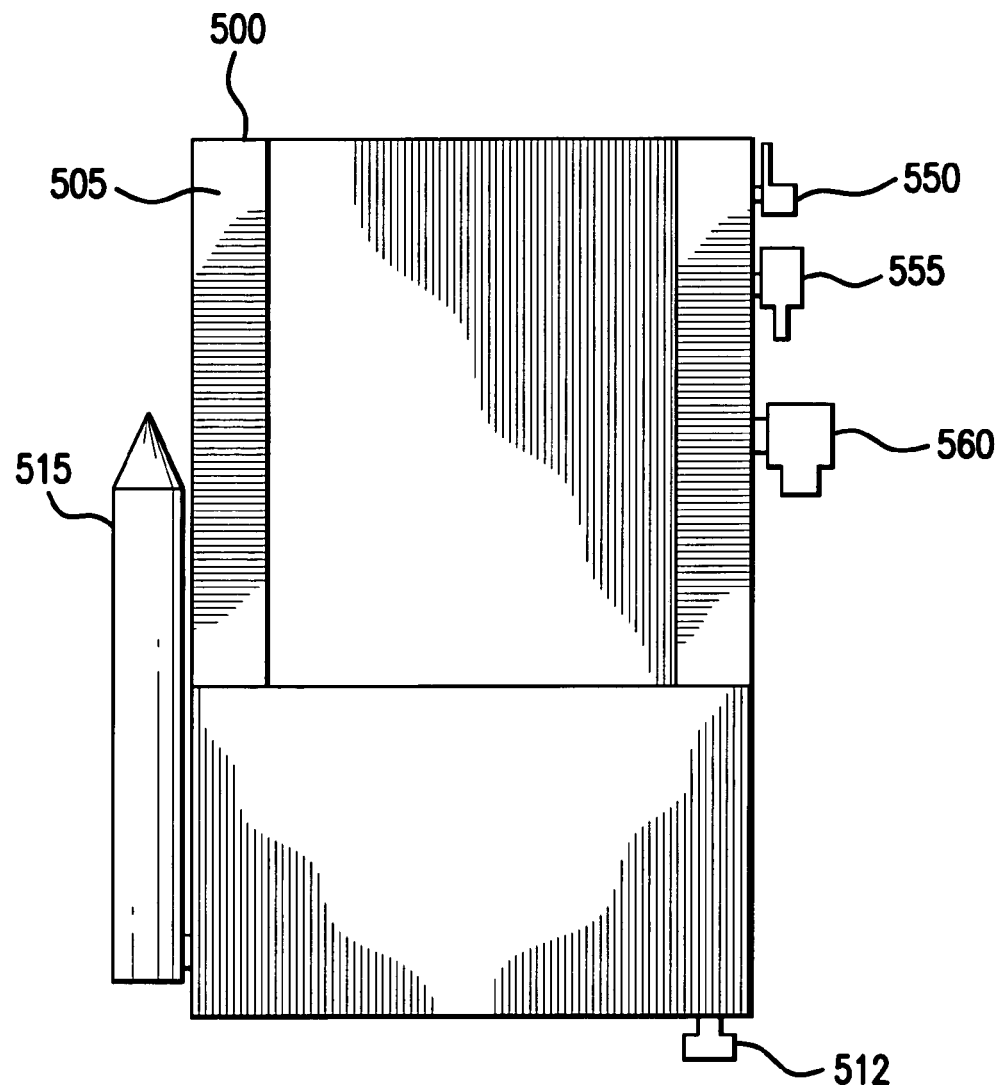
FIG. 5C illustrates a front view of the cradle casing according to an embodiment of the invention.

FIG. 5C illustrates a front view of the cradle casing 500 according to an embodiment of the invention. As shown, the several tips (e.g., 550, 555, and 560) may be coupled to a storage area of the cradle casing 500. Each of the tips may be for use with an electronic device having predetermined power requirements. The tips may be used to set the power sent from the cradle casing to the electronic device so that sufficient power may be supplied. In other embodiments, more or fewer than thee tips may be coupled to the cradle casing 500. The tips may be coupled to the cradle casing 500 so that a user may easily transport them along with the cradle casing 500.

Figure 6:
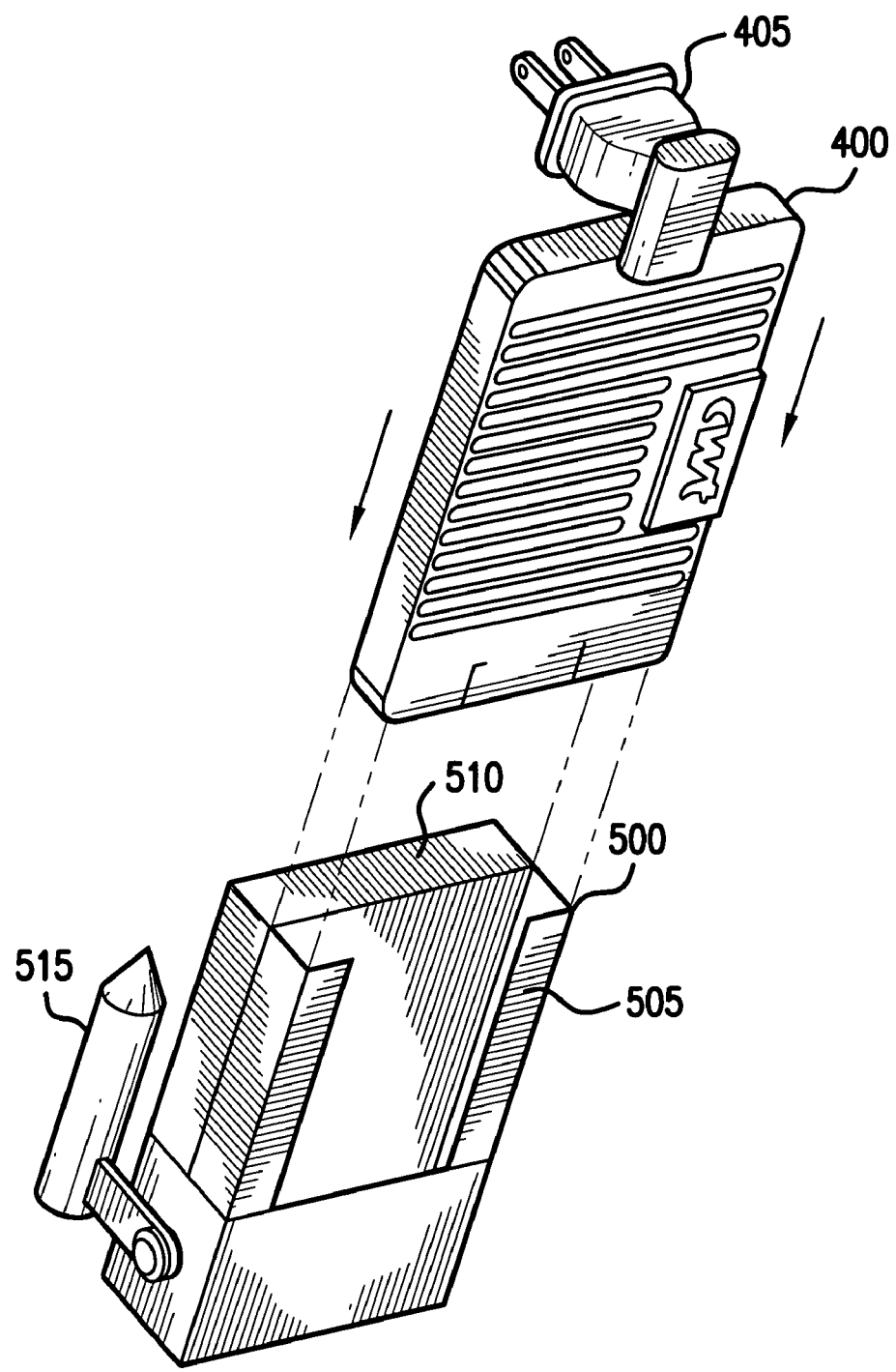
FIG. 6 illustrates an AC/DC adapter being moved toward the sleeve of the cradle casing according to an embodiment of the invention.

FIG. 6 illustrates an AC/DC adapter 400 being moved toward the sleeve 505 of the cradle casing according to an embodiment of the invention. As illustrated, the AC/DC adapter 400 is pushed in a downward direction, toward the sleeve 505 of the cradle casing 500 to in order to become electrically and mechanically coupled to the cradle casing 500. Once inserted into the sleeve 505 and pushed to the bottom, the pins on the AC/DC adapter 400 mate with the female-type connection device 520 in the cradle casing 500.

Figure 7:
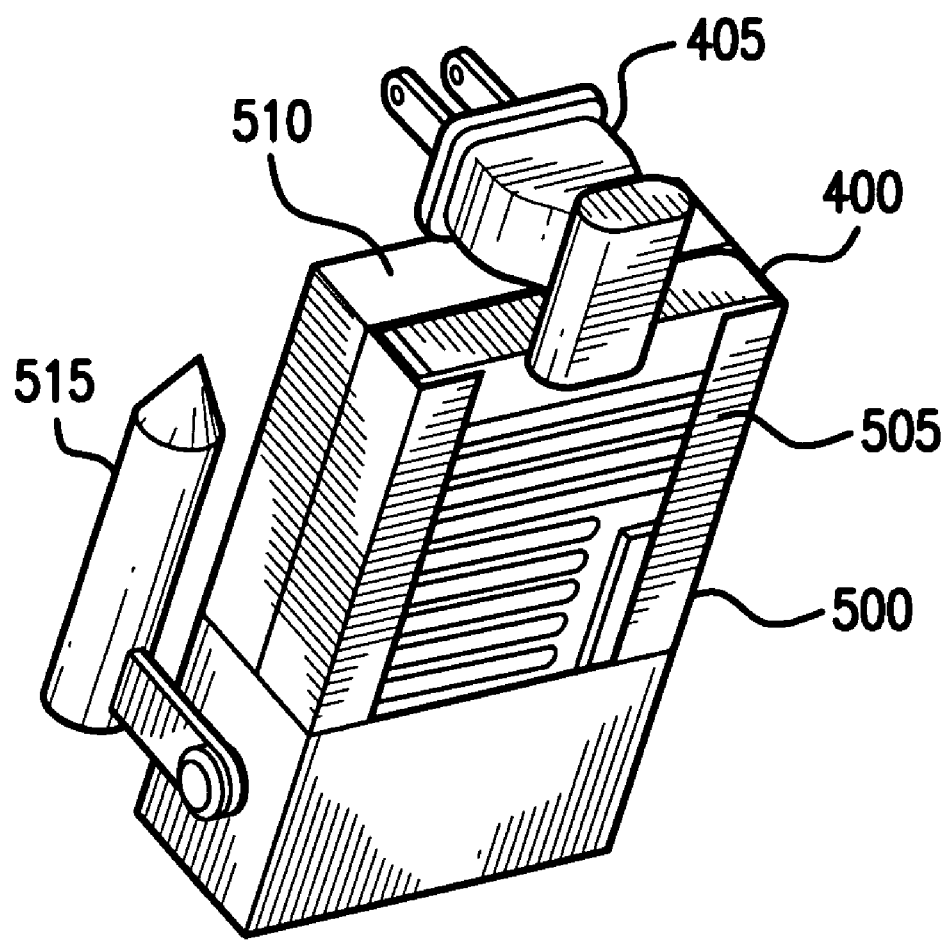
FIG. 7 illustrates an AC/DC adapter placed within a sleeve of a cradle casing according to an embodiment of the invention.

FIG. 7 illustrates an AC/DC adapter 400 placed within a sleeve 505 of a cradle casing 500 according to an embodiment of the invention. As shown, once completely inserted, the AC plug 405 of the AC/DC adapter 400 extends out of the cradle casing 500, and can be used to plug into an AC power source. Once the AC/DC adapter 400 is in place, the DC plug 515 may also be used to couple to a DC power source. Accordingly, once the AC/DC adapter 400 is coupled to the cradle casing 500, a user may power an electronic device regardless of whether the only available power source is DC or AC.

Figure 8:
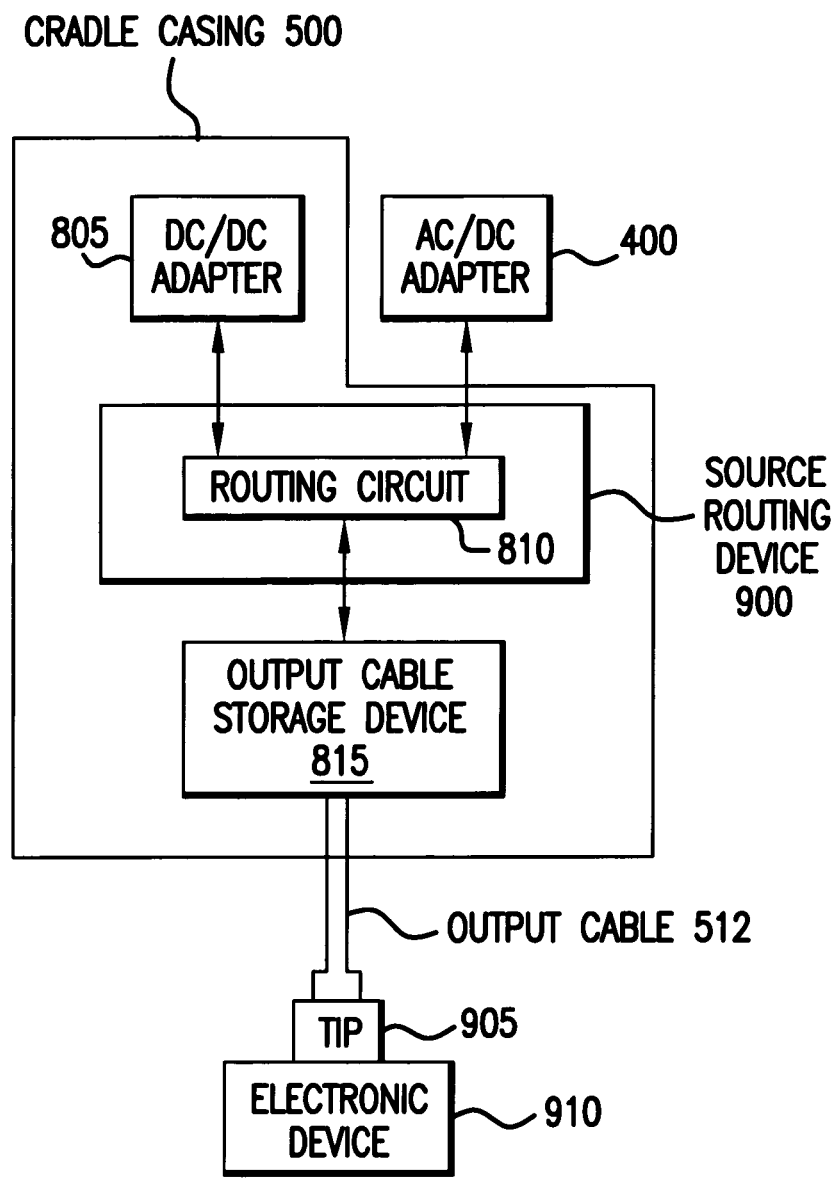
FIG. 8 illustrates a block diagram showing components of the cradle casing according to an embodiment of the invention.

FIG. 8 illustrates a block diagram showing components of the cradle casing 500 according to an embodiment of the invention. As shown, the cradle casing 500 may include a DC/DC adapter 805. The DC/DC adapter 805 may be housed within the back portion 510 of the cradle casing 500. The DC/DC adapter 805 may receive input DC power from a DC power source via the DC plug 515. The DC/DC adapter 805 outputs appropriate DC power to a routing circuit 810. When the AD/DC adapter 400 is electrically coupled to the cradle casing 500, the AC/DC adapter 400 may receive AC power from an AC power source via the AC plug 405. The AC/DC adapter 400 may output appropriate DC power to the routing circuit 810.

The routing circuit 810 may output either the DC power output received from the DC/DC adapter 805 or the DC power received from the AC/DC adapter 400. Typically, only one of the power sources (e.g., AC or DC) will be electrically coupled to the cradle casing 500 at any one time. However, in alternative embodiments, the routing circuit 810 may add the DC power output by the AC/DC adapter 400 and the DC/DC adapter 805 and send the summed DC power signal to an electronic device via the output cable 512. The output cable 512 may be retractable and may be housed within an output cable storage device 815.

As shown, the DC/DC adapter 805 is coupled to the routing circuit 810. The routing circuit 810 may be housed within a source routing device 900. The routing circuit 810 of the source routing device 900 may be electrically coupled to the output cable storage device 815, which houses the output cable 512. The output cable 512 may be coupled to a tip 905 (explained below with respect to FIG. 9) to supply power to an electronic device 910.

Figure 9:
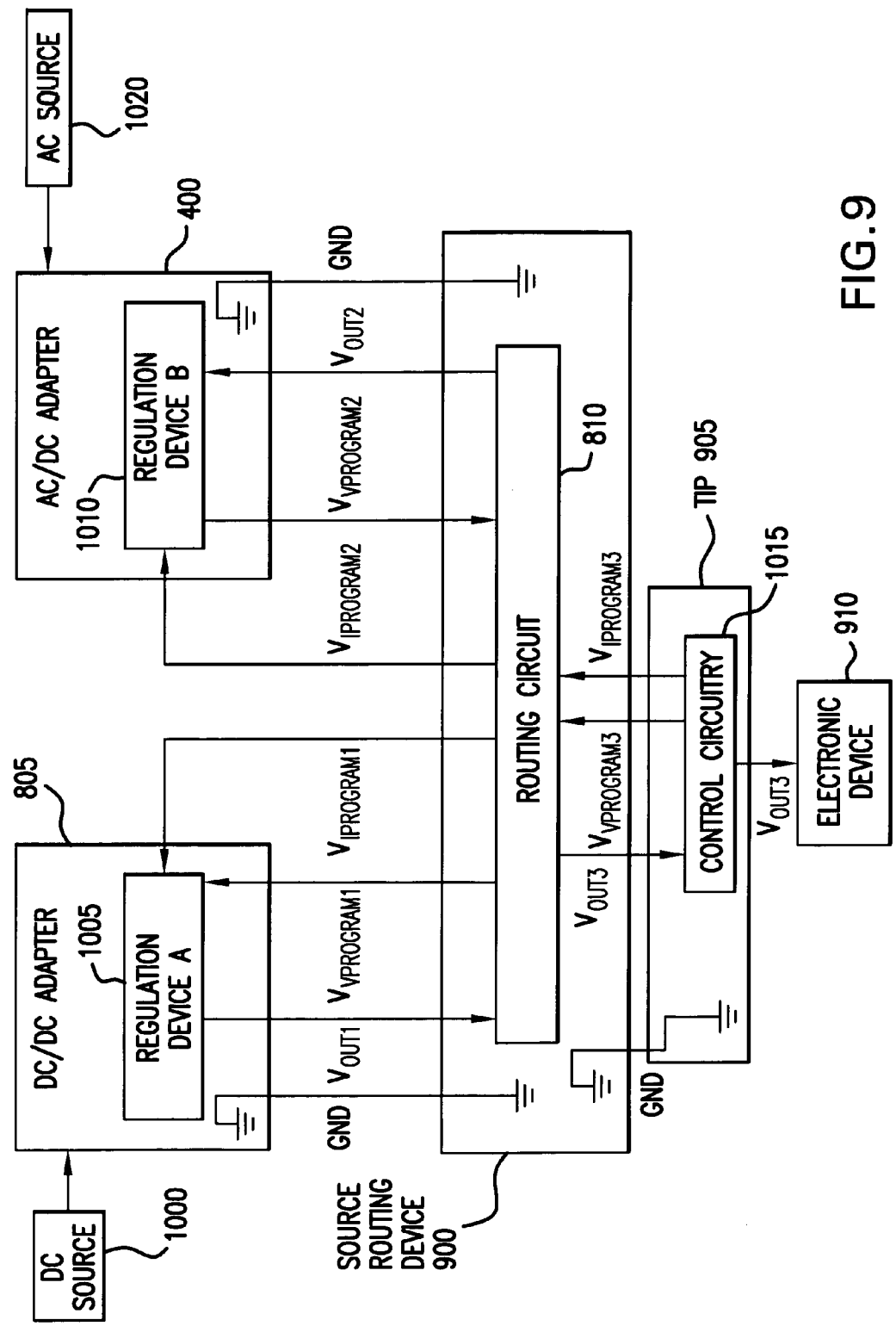
FIG. 9 illustrates a block diagram of a power supply system according to an embodiment of the invention.

FIG. 9 illustrates a circuit diagram of a power supply system according to an embodiment of the invention. As shown, a DC source 1000 may be coupled to the DC/DC adapter 805 of the cradle casing 505. An AC source 1020 may be coupled to the AC/DC adapter 400. the DC/DC adapter 805 may include regulation device A 1005. Regulation device A 1005 may be a voltage regulator or other device which may output an output voltage (i.e., $V_{out1}$) based on a voltage programming voltage (i.e., $V_{Vprogram1}$) received from the routing circuit 810 of the source routing device 900. Regulation device A 1005 may output a $V_{out1}$ that is a set multiple of $V_{Vprogram1}$. For example, if regulation device A 1005 is set to output a $V_{out1}$ that is exactly 3 times as large as $V_{Vprogram1}$, so that if $V_{Vprogram1}$ is 2 volts, then $V_{out1}$ will be 6 volts. Alternatively, regulation device A 1005 may output $V_{out1}$ according to a different multiple. Accordingly, the source routing circuit 810 may be utilized to set or program the amount of DC power output by the DC/DC adapter 805. The source routing circuit 810 may also output a current programming voltage (i.e., $V_{Iprogram1}$) to regulation device A 1005. $V_{Iprogram1}$ may be utilized to limit the amount of current output by the DC/DC adapter 805 in order to protect an electronic device to be powered, for example.

The AC/DC adapter 400 may also include a regulation device—regulation device B 1010. Regulation device B 1010 may function in a manner similar to regulation device A 1005. In other words, the source routing circuit 810 may supply a voltage programming voltage (i.e., $V_{Vprogram2}$) and a current programming voltage (i.e., $V_{Iprogram2}$) to regulation device B 1010 to set an output voltage (i.e., $V_{out2}$) output from the regulation device B 1010, and limit the current output therefrom, respectively. Regulation device B 1010 may output a $V_{out2}$ that is 3 times $V_{Vprogram2}$, or any other suitable multiple thereof.

Source routing circuit 810 may receive $V_{out1}$ from regulation device A 1005 and $V_{out2}$ from regulation device B 1010. Source routing circuit 810 may output $V_{Vprogram1}$ and/or $V_{Vprogram2}$ to regulations devices A 1005 and B 1010, respectively, to control the magnitude of $V_{out1}$ and $V_{out2}$, respectively. The source routing circuit 810 may sum $V_{out1}$ and $V_{out2}$ to create $V_{out3}$. $V_{out3}$ may be output to a tip 905. The tip 905 may include control circuitry 1015. The control circuitry 1015 may be formed of active or passive components. The active components may include a voltage regulator, and the passive components may include resistors. An example of a tip having active components is shown in U.S. patent application Ser. No. 10/313,662, filed Dec. 5, 2002, entitled "Tip Having Active Circuitry", filed Dec. 5, 2002, the disclosure of which is herein incorporated by reference.

The control circuitry 1015 in the tip 905 may be utilized to set the magnitude of the voltage output (i.e., $V_{out3}$), and limit the maximum amount of current supplied, to the electronic device 910. The control circuitry 1015 creates a voltage programming voltage (i.e., $V_{Vprogram3}$) which is sent to the routing circuit 810. $V_{Vprogram3}$ is utilized to set, or program, the magnitude of $V_{out3}$. The source routing circuit may include a regulation device to receive $V_{Vprogram3}$ and output $V_{out3}$ which is equal to a set multiple of $V_{Vprogram3}$. For example, as with regulation device A 1005, if the set multiple is 3, and $V_{Vprogram3}$ is 1.5 volts, then the regulation device in the source routing circuit 810 will output 4.5 Volts as $V_{out3}$. The control circuitry 1015 may also generate a current programming voltage (i.e., $V_{Iprogram3}$) to send to the source routing circuit 810 to limit the magnitude of current supplied to the tip 905.

Accordingly, the control circuitry 1015 in the tip 905 controls the magnitude of the voltage (i.e., $V_{out3}$) supplied by the source routing circuit 810, which is turn controls the magnitude of the voltages (i.e., $V_{out1}$ and $V_{out2}$) supplied by regulation devices A 1005 and B 1010, respectively.

Figure 10:
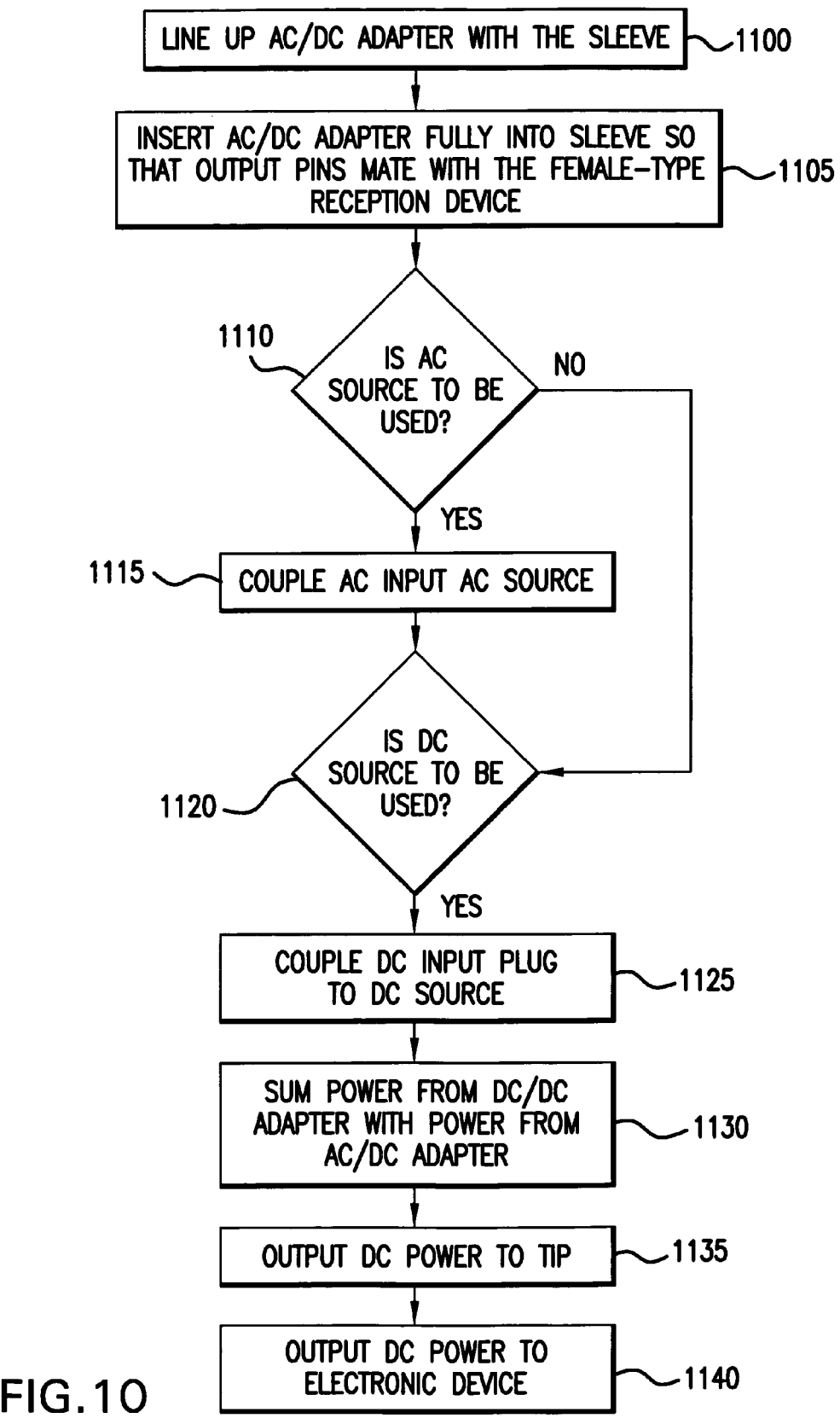
FIG. 10 illustrates a method of using the cradle casing with an AC/DC adapter according to an embodiment of the invention.

FIG. 10 illustrates a method of using the cradle casing 500 with an AC/DC adapter 400 according to an embodiment of the invention. A user may start out with a separate AC/DC adapter 400 and a cradle casing 500. First, the user may line up 1100 the AC/DC adapter 400 with the sleeve 505 of the cradle casing 500. Next, the user may insert 1105 the AC/DC adapter 400 fully into the sleeve 505 so that the output pins (i.e., GND pin 410, $V_{Vprogram2}$ pin 415, $V_{Iprogram2}$ pin 420, and $V_{out2}$ pin 425) of the AC/DC adapter 400 mate with the female-type reception device 520 of the cradle casing 500.

Next, the user may determine 1110 whether an AC source 1020 is to used. If "yes," the method continues at operation 1115 where the AC input plug 405 is coupled to the AC source 1020. If "no," the method proceeds to operation 1120, where the user determines whether a DC source 1000 is to be used. If "yes," the user may couple 1125 the DC input plug 515 to the DC source 1000. The user may then utilize the cradle casing to provide DC power to the electronic device 910.

Figure 11:
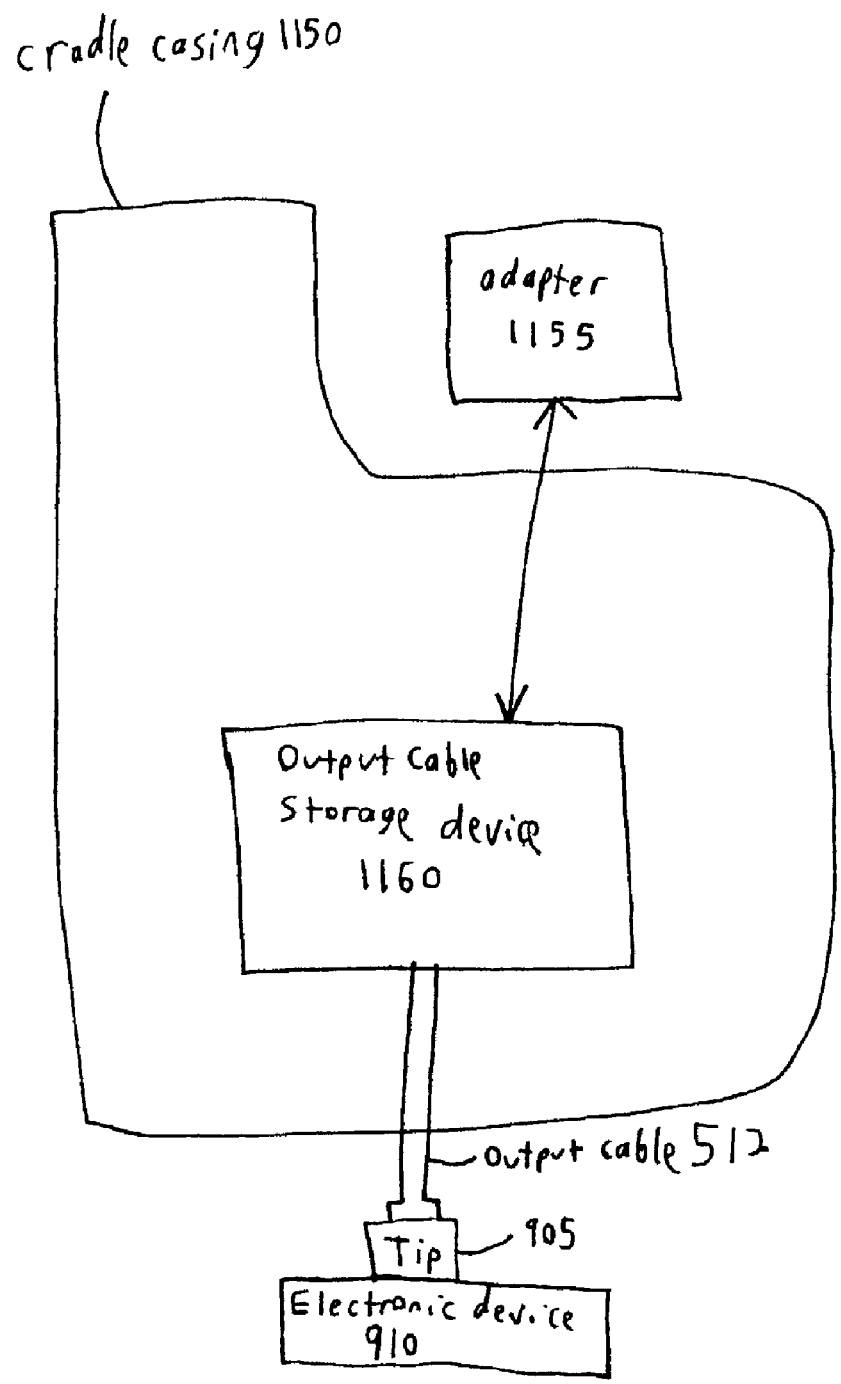
FIG. 11 illustrates a cradle casing according to an embodiment of the invention.

FIG. 11 illustrates a cradle casing 1150 according to an embodiment of the invention. The cradle casing 1150 is similar to the cradle casing 500 shown in FIG. 8. however, unlike cradle casing 500 of FIG. 8, cradle casing 1150 may lack an internal DC/DC adapter 805 and routing circuit 810. Accordingly, cradle casing 1150 may be utilized to accept an adapter 1155, which may be an AC/DC adapter 400 or a DC/DC adapter 805. The cradle casing 1150 may include a sleeve 505, or any other component to physically receive the adapter 1155. When inserted in place, the adapter 1155 may be electrically coupled to the output cable storage device 1160. The adapter 1155 may be directly coupled to the output cable storage device 1160 or may be indirectly couple thereto (e.g., adapter 1 55 may be directly coupled to a circuit within the cradle casing 1150, which may, in turn, be directly coupled to output cable storage device 1160).

The output cable storage device 1160 may be coupled to a tip 905 via output cable 512. The tip 905 may be coupled to electronic device 910. Accordingly, the adapter 1155 may provide power to the electronic device 910 via cradle casing 1150. The cradle casing 1150 may therefore be utilized to provide a simple cable management mechanism. The cradle casing 1150 may also serve to protect the adapter 1155 (e.g., the cradle casing 1150 may be made of a stronger material than the adapter 1155).

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A cradle casing, comprising:
    a DC/DC adapter to receive DC power from a DC power source and generate a first DC power signal;
    a sleeve to accept an AC/DC adapter, wherein the sleeve guides a movement of the AC/DC adapter when the AC/DC adapter is inserted into the cradle casing, the AC/DC adapter being capable of receiving AC power from an AC power source and generating a second DC power signal; and
    a circuit to receive at least one of the first DC power signal and the second DC power signal and to output a third DC power signal.

2. The cradle casing according to claim 1, further including a mating device to electrically couple the cradle casing to the AC/DC adapter.

3. The cradle casing according to claim 1, further including an output cable to provide the third DC power signal to an electronic device.

4. The cradle casing according to claim 3, wherein the output cable is stored within an output cable storage device.

5. The cradle casing according to claim 3, wherein a tip is coupled to an end of the output cable to couple to the electronic device.

6. The cradle casing according to claim 3, further including a storage area to store at least one tip to couple an end of the output cable to the electronic device.

7. The cradle casing according to claim 1, further including a DC plug to couple the DC/DC adapter to the DC power source.

8. The cradle casing according to claim 1, wherein the AC/DC adapter further includes an AC plug to electrically couple the AC/DC adapter to the AC power source.

9. The cradle casing according to claim 1, wherein the circuit receives both the first DC power signal and the second DC power signal, and sums the first DC power signal and the second DC power signal to generate the third DC power signal.

10. A method, comprising:
    inserting an AC/DC adapter into a sleeve of a cradle casing, wherein the cradle casing includes a DC/DC adapter, and the sleeve guides movement of the AC/DC adapter, and the AC/DC adapter receives AC power from an AC power source and generates a first DC power signal, and the DC/DC adapter receives DC power from a DC power source and generates a second DC power signal;
    electrically mating the AC/DC adapter to the cradle casing, wherein the cradle casing includes a circuit to receive at least one of the first DC power signal and the second DC power signal and outputs a third DC power signal; and
    coupling an output cable of the cradle casing to an electronic device, wherein the output cable provides the third DC power signal to the electronic device.

11. The method according to claim 10, wherein the output cable is stored within an output cable storage device.

12. The method according to claim 10, further including plugging a DC plug of the cradle casing to the DC power source to couple the DC/DC adapter to the DC power source.

13. The method according to claim 10, further including plugging an AC plug of the AC/DC adapter to the AC power source to electrically couple the AC/DC adapter to the AC power source.

14. The method according to claim 10, further including coupling a tip to an end of the single output cable to couple to an electronic device.

15. The method according to claim 10, further including storing, in a storage area, at least one tip to couple an end of the single output cable to the electronic device.

16. The method according to claim 10, wherein the circuit receives both the first DC power signal and the second DC power signal, and sums the first DC power signal and the second DC power signal to generate the third DC power signal.

* * * * *